United States Patent [19]

Hammond

[11] Patent Number: 4,575,270

[45] Date of Patent: Mar. 11, 1986

[54] HOSE END SPRAYER

[75] Inventor: Dennis A. Hammond, Ottawa, Canada

[73] Assignee: Dustbane Products Limited, Ottawa, Canada

[21] Appl. No.: 669,650

[22] Filed: Nov. 6, 1984

[51] Int. Cl.$^4$ ............................................. A46B 11/06
[52] U.S. Cl. ........................................ 401/40; 401/42; 401/43; 401/289; 239/323; 239/313; 137/268
[58] Field of Search ..................... 401/40–43, 401/136, 188, 289; 239/310, 312, 313, 322, 323; 137/268; 15/24, 29; 128/65, 66; 222/95, 131

[56] References Cited

U.S. PATENT DOCUMENTS

| | | | |
|---|---|---|---|
| 1,741,435 | 12/1929 | Rickersberg | 401/289 |
| 2,545,110 | 3/1951 | Schaar et al. | 401/43 |
| 2,908,445 | 10/1959 | Schwartz | 239/317 |
| 3,259,321 | 7/1966 | Sellers | 239/310 |
| 3,447,753 | 6/1969 | Proctor | 239/317 |
| 3,770,205 | 11/1973 | Proctor | 239/317 |
| 4,340,179 | 7/1982 | Knapp | 239/310 |
| 4,458,830 | 7/1984 | Werding | 239/323 |

FOREIGN PATENT DOCUMENTS

| | | | |
|---|---|---|---|
| 652428 | 11/1962 | Canada | 50/8 |
| 1058360 | 7/1979 | Canada | 15/103 |
| 1165742 | 4/1984 | Canada | 222/31 |
| 8403923 | 10/1984 | Fed. Rep. of Germany | 401/289 |
| 165116 | 1/1934 | Switzerland | 401/289 |
| 9321 | of 1894 | United Kingdom | 401/43 |

Primary Examiner—Richard J. Apley
Assistant Examiner—Alfedo Acoff
Attorney, Agent, or Firm—Berman, Aisenberg & Platt

[57] ABSTRACT

An improved hose end sprayer is provided in which chemical concentrate from a reservoir circumscribing a tube secured to the end of the hose is gradually fed into a liquid stream passing through the tube. A back pressure baffle is fitted within the tube between a pair of holes spaced in the tube in the portion thereof circumscribed by the reservoir walls. A first of the holes permits gradually release of liquid concentrate within the reservoir when under pressure into the tube. This hole is positioned downstream of the baffle. A partition within the chamber is fitted over the tube, at least a portion thereof being movable under pressure from liquid within the tube passing through the second hole upstream of the baffle into the reservoir. This action causes sufficient pressure on the concentrate to cause its gradual release through the first hole into the tube. This relatively simple construction enables concentrate from the reservoir to be passed into the stream of liquid while the partition minimizes dilution of the concentrate in the reservoir by liquid from the tube, a problem often found in prior art hose end sprayers of this general type.

20 Claims, 6 Drawing Figures

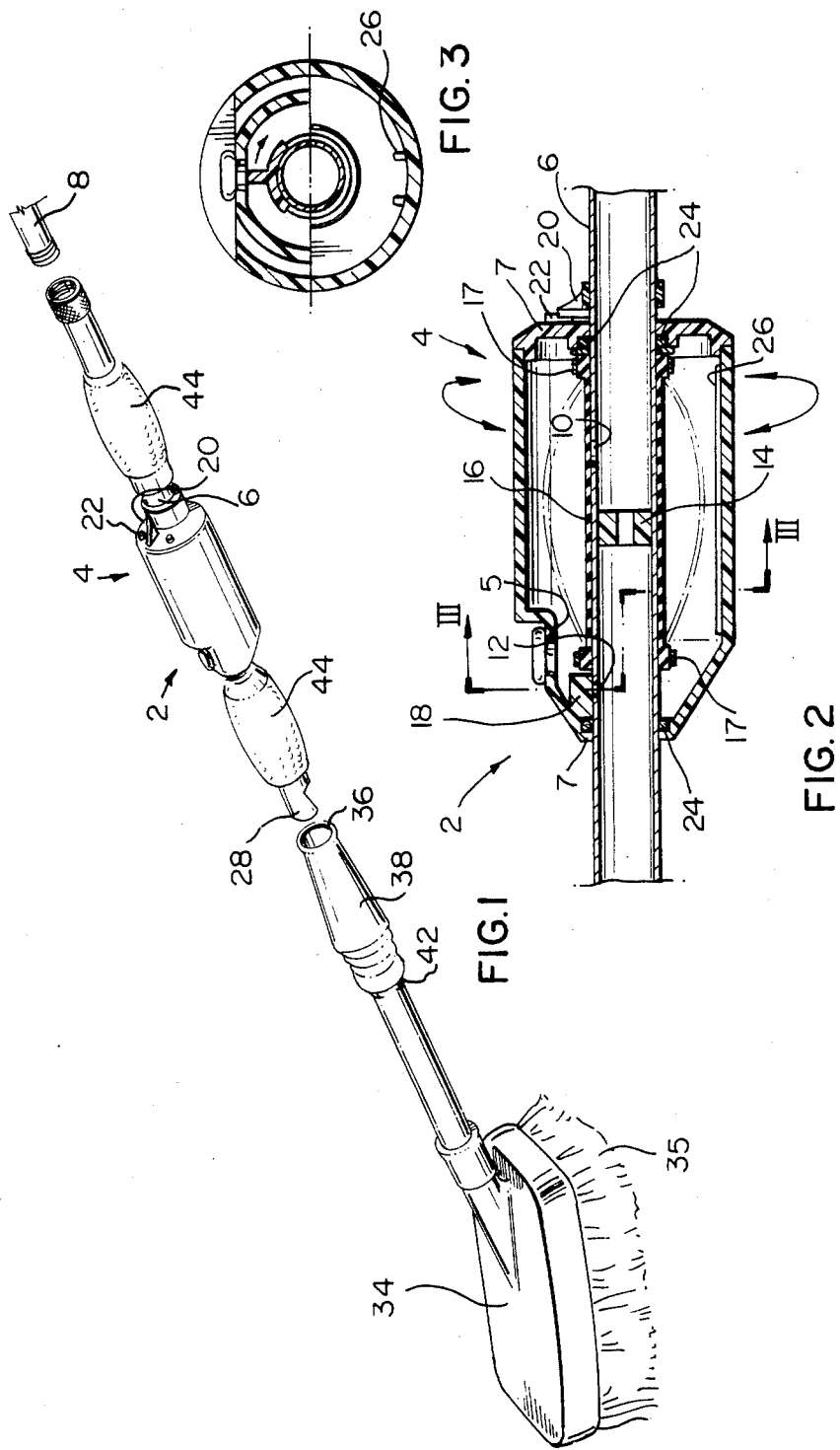

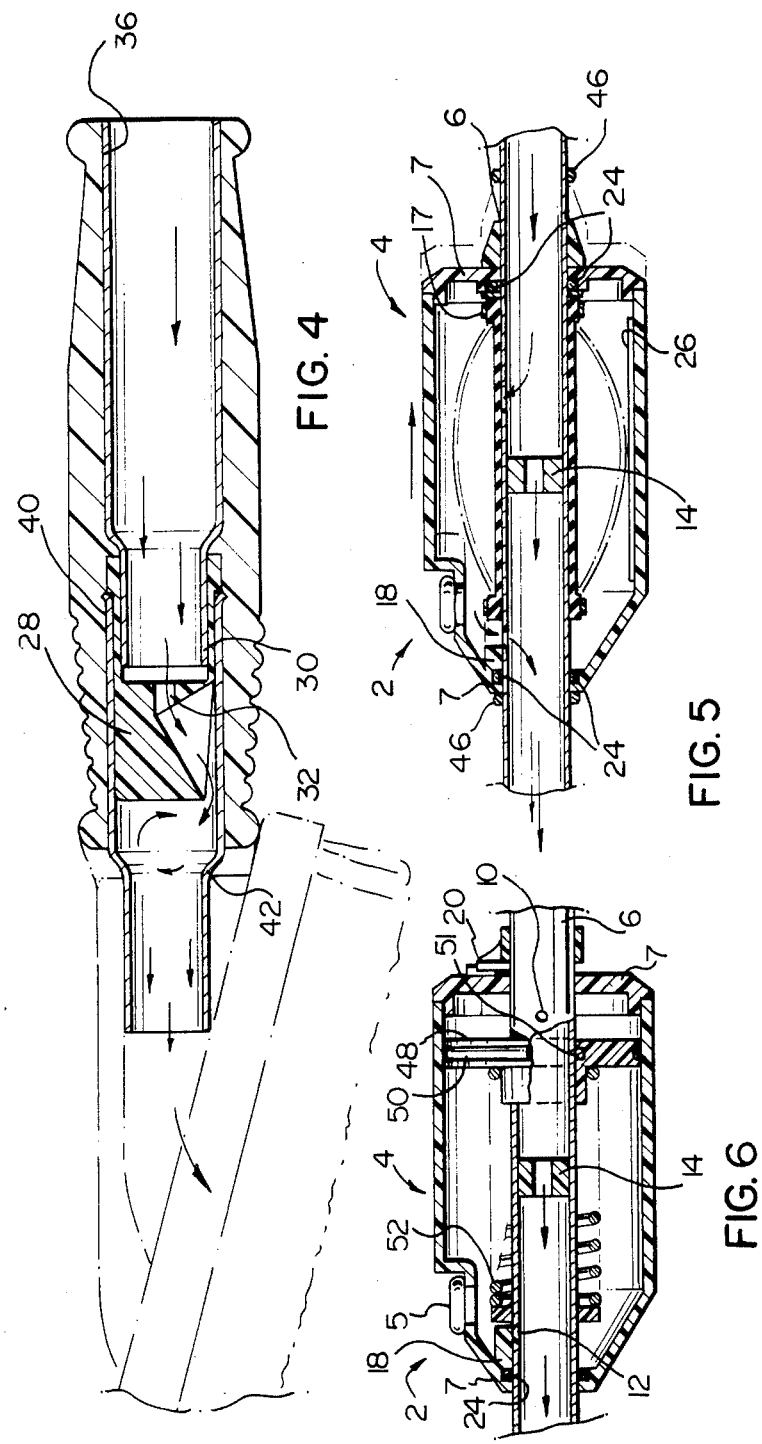

HOSE END SPRAYER

BACKGROUND OF THE INVENTION

The present invention relates to a hose end sprayer and more particularly to a sprayer of the type which provides for the addition of a concentrate to the liquid being sprayed. The device of the present invention has particular application as a spray washer with detergent feed for washing vehicles, and will be described in this context. It is however not intended to limit the invention to such an application. Indeed, as will be apparent to one skilled in the art from the following description, the present invention has application alternatively to dispensing of liquid or soluble chemicals such as pesticides or plant food additives into a liquid stream being sprayed from a hose end.

Hose end sprayers of the type in question have been previously developed in many different constructions. For example, U.S. Pat. No. 2,908,445 of Schwartz, issued Oct. 13, 1959 describes and illustrates a fountain detergent brush which is useful as an automobile washing brush, in which a soap chamber is mounted, circumscribing a central tube, to slide up and down between operative and inoperative positions on that tube. In operative position, a pair of holes in the tube, communicating with the soap chamber, are opened and water passing through the tube enters the soap chamber and mixes with the soap, so that soap is passed into the water flowing through the tube. In inoperative position these holes are closed so that only pure water, without soap, passes through the tube. Such a device, during operation, provides for a diminished concentration of soap in the chamber, as water mixes with it, so that, towards the end of operation, significantly smaller concentrations of soap are being mixed with the water. This may have a detrimental effect in the washing operation, particularly in those situations where it is desired to have a concentration of soap at the end of the washing operation which is as high as that which existed when the operation commenced. Constructions of sprayers similarly having water co-mingling with the soap in the chamber of the sprayer device are found in Proctor et al U.S. Pat. No. 3,447,753 issued June 3, 1969, Proctor et al U.S. Pat. No. 3,770,205 issued Nov. 6, 1973, and Canadian Pat. No. 1,058,360 of Stoyshin issued July 17, 1979.

Spray devices with chambers holding soap or other chemicals to mix with water, or other liquids passing through associated hoses, in which there is no co-mingling of the water or other liquid with the soap or other chemical in the chamber are found in the prior art as well. For example, Sellers U.S. Pat. No. 3,259,321 issued July 5, 1966 describes and illustrates a canopy type-chamber with collapsible walls mounted on a hose nozzle. By squeezing the walls of the chamber the soap contained in the chamber is forced through a valve opening into a stream of water passing through the nozzle. In Belswenger et al Canadian Pat. No. 1,165,742 issued Apr. 17, 1984, a hose end sprayer is described in which concentrate from a reservoir associated with the spray end nozzle of a hose is drawn from the reservoir by means of suction which is created by the flow of water through a specially constructed chamber at the top of the reservoir and communicating therewith. Koeberich Canadian Pat. No. 652,428 issued Nov. 20, 1962 teaches another such device, this time the reservoir for the concentrate sitting above tubing which is connected to the hose line. A valve associated with the reservoir is opened to permit the concentrate, apparently by gravity, to flow into the water line from the reservoir.

Another patent of general background interest is Knapp U.S. Pat. No. 4,340,179 issued July 20, 1982 which describes and illustrates a cartridge which is connectable to a hose so that water passing through the cartridge from the hose draws nutrients which are then discharged to a lawn through the sprinkler or nozzle at the end of the hose.

It is an object of the present invention to provide a hose end sprayer for car washing and other applications, which will dispense a chemical concentrate from a reservoir without dilution of the concentrate in the reservoir as the device is used. It is a further object of the present invention to provide a novel construction of hose end sprayer which will have particular application in car washing, and which may be used in conjunction with a car wash brush.

SUMMARY OF THE INVENTION

According to the present invention there is provided a hose end sprayer which comprises a tube, a hose attachment means at one end of the tube and a spray means for producing and directing a spray of liquid at the other end of the tube, a chemical concentrate reservoir secured to and having walls circumscribing a portion of the tube between the ends of the tube, and a passageway, normally blocked, to enable filling of the reservoir of concentrate being positioned in the walls of the reservoir. A pair of holes are spaced along the length of the tube in the portion thereof circumscribed by the reservoir walls. A back pressure baffle or plug is fitted within the tube between the holes, the bottom plug having an aperture to permit flow of liquid within the tube through the baffle or plug and to create a differential in pressure between the liquid upstream and downstream of the baffle or plug. The first one of the holes permits gradual release of liquid concentrate within the reservoir, when under pressure, into the tube, being positioned downstream of the plug. A partition means is fitted within the chamber over the tube. At least a portion of the partition means is movable during operation under pressure from liquid within the tube upstream of the baffle passing through the second one of the holes and bearing on one side of the partition means, to provide sufficient pressure on the liquid concentrate within the reservoir to cause its gradual release through the first hole into the stream of liquid passing through the tube. The partition means obstructs passage of liquid, entering the chamber through the second hole, to the concentrate on the other side of the partition means.

The partition means is preferably an elongated flexible tube-like impermeable membrane positioned within the chamber, fitted over the tube and over the second one of the holes therein but not the first. The ends of the membrane are secured to the tube to prevent passage of liquid from the tube past the ends of the membrane into the reservoir. The membrane is expandable within the reservoir walls, during operation, under pressure of the liquid upstream of the plug as it passes through the second hole, to provide sufficient pressure on the liquid concentrate within the reservoir to permit its gradual release through the first hole into the stream of liquid passing through the tube.

In a preferred embodiment of the sprayer according to the present invention, the reservoir is mounted on the tube so that it can be moved between two positions, and a seal from the first hole is secured to the walls of the reservoir in such a manner that, when the reservoir is in one of the positions the seal locks the first hole, and when the reservoir is in the other position, the seal is clear of the hole permitting concentrate within the reservoir to pass through the hole as the reservoir pressure is increased. It is preferred that the movement of the reservoir be a rotational movement with respect to the tube, although that movement may alternatively be a sliding movement parallel to the axis of the tube.

When the hose end sprayer according to the present invention is intended for washing vehicles a removable brush may be fitted to the end of the sprayer having the spray means, so that a soap and water mixture may be passed from the sprayer out through the brush. If just a spray of soap and water is required, the brush may be removed and the spray from the spray means is then directed at the vehicle. Of course, when the aforementioned preferred embodiment of the sprayer is used, the reservoir may be positioned to provide either a mixture of soap and water through the brush or spray means, or alternatively to provide only water.

It will be appreciated that the partition means of the sprayer according to the present invention prevents liquid from admixing with the concentrate in the chamber as concentrate is dispensed from the reservoir into the stream of liquid passing through the tube.

The construction of the sprayer according to the present invention is relatively simple and maintenance free, requiring few moving parts.

BRIEF DESCRIPTION OF THE DRAWINGS

These and other objects and advantages of the invention will become apparent upon reading the following detailed description and upon referring to the drawings in which:

FIG. 1 is a perspective view of a hose end sprayer according to the present invention in combination with a vehicle wash brush;

FIG. 2 is a section view of the tube and reservoir of the sprayer of FIG. 1;

FIG. 3 is a section view taken along line III—III of FIG. 2;

FIG. 4 is a partial view in cross-section of the brush mounted on the end of sprayer of FIG. 1;

FIG. 5 is a schematic view, in cross-section, of an alternative embodiment of the sprayer according to the present invention; and FIG. 6 is a schematic view in cross-section of another embodiment of the sprayer according to the present invention.

While the invention will be described in conjunction with example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the following description, similar features in the drawings have been given similar reference numerals.

Turning to FIG. 1, there is shown a perspective view of a hose end sprayer 2 according to the present invention, in this case specifically set-up for use as a pressure, spray washer for vehicles. The sprayer comprises a venerally cylindrical reservoir 4 to hold soap, this reservoir circumscribing a portion of tube 6 which is made of aluminum or any other appropriate material. Soap reservoir 4 may be filled with soap through normally stoppered filler hole 5. As can be seen in FIG. 2, reservoir end walls 7 are seated about tube 6 in such a manner that reservoir 4 may be rotated with respect to that tube. One end of tube 6 is adapted to be releasably secured to an end of hose 8, for delivery of water to pressure water tube.

As can be seen in the section view of reservoir 4 set out in FIG. 2, tube 6 is provided with a pair of holes 10 and 12, which are spaced along its portion circumscribed by reservoir 4. A back pressure baffle or plug 14 is secured within tube 6, with hole 10 being located upstream thereof and hole 12 downstream thereof. An elongated, flexible tube-like impermeable membrane 16 is fitted over tube 6 within reservoir 4, the ends of membrane 16 being secured about the tube by means of clamp ties 17. Membrane 16 covers hole 10, but is clear of hole 12.

It will be noted from FIG. 2 that hole 12 is relatively small, and has sides outwardly flared towards the interior of tube 6. This hole is designed to enable soap from reservoir 4 to pass into tube 6, where it will be mixed with water passing through that tube. A seal or stopper 18, is secured to the wall of reservoir 4. An arm 20 is secured, outside of the walls of reservoir 4, but adjacent to one of the ends thereof, arm 20 located between stops 22 which are formed as outwardly projecting lugs spaced from each other on the corresponding end 7 of reservoir 4. Arm 20, co-operating with stops 22, restricts the rotational movement of reservoir 4 with respect to tube 6 in such a manner that, in one extreme position, with arm 20 bearing against one of the stops 22, seal 18 covers hole 12 thereby preventing he flow of soap from reservoir 4 through that hole (FIG. 3). With the reservoir rotated to the other position, with arm 20 bearing against the other lug 22, the seal 18 is then clear of hole 12, permitting the flow of soap through hole 12. The bevelled or outwardly flared shape of hole 12 towards the interior of tube 6 enables clearance of potential blockages of this hole, for example by solids in the soap, under pressure of the soap in the reservoir. "O"-rings 24 in ends 7 of reservoir 4 act as seals to restrict the escape of soap from reservoir 4 through ends 7 where they meet tube 6, during movement of reservoir 4 with respect to tube 6.

Turning now to the action which takes place at hole 10, baffle or plug 14 is provided to create a pressure differential, during operation of sprayer device 2, between holes 10 and 12, with the higher pressure upstream of plug 14. For example, in one experimental model, in which a hose 8 was connected to normal mains pressure, a baffle having a 5/32 inch diameter hole passing through it was inserted in a tube 6 having a $\frac{5}{8}$ inch inner diameter. During operation, the pressure upstream of baffle 14 was 50 psi. while that downstream was 37 psi.

With this type of pressure differential, when seal 18 is clear of hole 12, membrane 16, made of rubber or latex, expands or inflates (FIG. 2, phantom) to fill the chamber of reservoir 4 and thereby forces soap from that chamber, through hole 12, into water passing downstream from baffle 14, as it passes by hole 12. Of course, when reservoir 4 is rotated with respect to tube 6 so that seal 18 covers hole 12, soap can no longer be forced through the hole. If water then continues to flow through tube 6, pure water is sprayer from sprayer 2. A pair of spaced rails 26 or the like may be situated along the outer walls of reservoir 4, as illustrated in FIGS. 2 and 3, to ensure continued passage of soap within reservoir 4 from the far end towards the end where hole 12 is situated, and prevent restriction of such passage of soap by the expanded membrane 16.

When the water passing through hose 8 is turned off, and mains pressure goes to zero, water which has passed through hole 10 to inflate membrane 16, is forced back through hole 10 into tube 6, as membrane 16 assumes its original, non-inflated position (FIG. 2).

An appropriate spray means, which in the drawings is illustrated as being a plastic fan jet nozzle 28, is secured to the outlet end 30 of tube 6 (FIGS. 1 and 4). Nozzle 30, as can be seen in FIG. 4, is provided with a constricted outlet opening at its end 32, which then downwardly directs and spreads the water leaving the nozzle into a spray.

Sprayer 2 according to the present invention may be used in conjunction with a standard vehicle washer brush 34 which transmits water from a hose or tube through its body to bristles 35. In this case, brush 34 is removably seated on the fan jet nozzle 28 and end 32 of sprayer 2 through a socket 36 in the brush handle 38. In such applications, it has been found very desirable to provide a collar 40 (FIG. 4), providing a shoulder 42 against which the spray from fan jet nozzle 28 is directed, within the socket 36 of brush handle 38. When opening 12 in tube 6 is uncovered, and a soap and water mixture is being passed through tube 6, the turbulence created as the spray of the soap and water mixture hits shoulder 42 creates a desirable foam of air, water and soap to be passed to the bristles 35 of brush 34.

As can be seen in FIG. 1, appropriate handles 44 may be provided on tube 6, on either side of reservoir 4, to facilitate manipulation of sprayer 2.

In the alternative embodiment of the present invention illustrated in FIG. 5, soap reservoir 4, instead of pivoting with respect to tube 6, is set up to slide up and down on tube 6, in a direction parallel to the axial direction of that tube. In such case, appropriate stops 46 formed as projections in the body of tube 6, to either side of end walls 7 of reservoir 4 may be provided to limit the relative movement of reservoir 4 on tube 6.

In the further alternative embodiment illustrated in FIG. 6, instead of a flexible tube-like impermeable membrane 16 being the partition means, a piston 48 circumscribing the tube 6 and movable longitudinally thereon within reservoir 4 is provided. Hole 10 upstream of baffle 14 in tube 6 is positioned between the corresponding end wall 7 of reservoir 4 and piston 48. Piston seal 50 along the outer periphery of piston 48, and O-ring 51 along its inner periphery, are provided to obstruct the passage of water from the upstream, water-side of piston 48 to the downstream, soap side thereof within reservoir 4.

In operation, when the reservoir 4 is rotated so that seal 18 clears hole 12, to thereby permit the flow of soap from reservoir 4 through that hole, water from within tube 6 upstream from baffle 14 passes through hole 10 into the chamber of reservoir 4 between piston 48 and the nearby end wall 7 of the reservoir. The increased pressure thereby created on piston 48 forces that piston to the left, overcoming the bias of return spring 52, to force soap through hole 12 into the stream of water flowing through tube 6 downstream from baffle 14. As is the case with embodiments previously described, when reservoir 4 is moved with respect to tube 6 so that seal 18 covers hole 12, soap can no longer be forced through that hole. When the water pressure upstream of baffle 14 is equalized with that downstream thereof, for example when water at the source is turned off, return spring 52 forces piston 48 back to its starting position more or less illustrated in FIG. 6.

While the sprayer according to the present invention has been described and illustrated essentially as a hose and sprayer for water and soap, having particular utility in washing of vehicles, it is not intended to limit the invention to such applications. As has been previously indicated, it will be readily appreciated that the device according to the present invention may be used, with appropriate modifications obvious to those skilled in the art, in situations where a concentrate, in liquid form, is desired to be mixed with a liquid for application for a particular purpose. Thus, the device according to the present invention may be adapted, for example to dispense diluted aqueous solutions of plant fertilizers, herbicides, pesticides and the like (such applications, of course, excluding removable brush 34).

Thus it is apparent that there has been provided in accordance with the invention a hose end sprayer that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention is:

1. In a hose end sprayer comprising a tube, hose attachment means at one end of the tube and spray means for producing and directing a spray of liquid at the other end of the tube, a chemical concentrate reservoir secured to and having walls circumscribing a portion of the tube between the ends of the tube, and an opening, normally blocked, to enable filling of the reservoir with concentrate, being positioned in the walls of the reservoir, wherein the improvement comprises a pair of holes spaced along the length of the tube in the portion thereof circumscribed by the reservoir walls, a back pressure baffle fitted within the tube between the holes, the baffle having an aperture to permit flow of liquid within the tube through the baffle and to create a differential in pressure between the liquid upstream and downstream of the baffle, a first one of the holes to permit gradual release of liquid concentrate within the reservoir, when under pressure, into the tube, being positioned downstream of the baffle, partition means within the chamber fitted over the tube and at least a portion thereof being movable during operation under pressure from liquid within the tube upstream of the baffle passing through the second one of said holes and bearing on one side of the partition means to provide sufficient pressure on the liquid concentrate within the reservoir to cause its gradual release through the first hole into the stream of liquid passing through the tube, the partition means obstructing passage of the liquid entering the chamber through the second hole to the concentrate on the other side of the partition means.

2. A sprayer according to claim 1 wherein the partition means comprises an elongated flexible tube-like impermeable membrane positioned within the chamber, fitted over the tube and over the second one of the holes therein but not the first, the ends of the membrane being secured to the tube to prevent passage of liquid from the tube past the ends of the membrane into the reservoir, the membrane being expandable within the reservoir walls, during operation, under pressure of the liquid upstream of the baffle to provide sufficient pressure on the liquid concentrate within the reservoir to cause its gradual release through the first hole into the stream of liquid passing through the tube.

3. A sprayer according to claim 2 wherein the walls of the reservoir are movable with respect to the tube, between first and second positions, and a stop means is associated with the walls of the reservoir and movable therewith to block the passage of concentrate from the reservoir through the first hole in the tube when the reservoir walls are in first position, and to permit the flow of concentrate through the first hole when in second position.

4. A sprayer according to claim 3 wherein the stop means is a seal secured to the walls of the reservoir and movable therewith with respect to the tube, the seal covering the first hole to block passage of concentrate in the first position and being positioned clear of the hole in the second position.

5. A sprayer according to claim 4 wherein the walls of the reservoir are rotatable with respect to the tube between the first and second positions.

6. A sprayer according to claim 4 wherein the walls of the reservoir are slidable up and down the tube between the first and second positions.

7. A sprayer according to claim 5 wherein an arm is provided outwardly, radially extending with respect to the tube and immovably secured thereto, and a pair of outwardly extending protrusions are provided on the walls of the reservoir, the arm of the tube and the protrusions of the walls of the reservoir being positioned and co-operating with each other so that the arm bears against one of the protrusions when the reservoir walls have been rotated to the first position, to identify that position and prevent rotation of the walls past that position, and the arm bears against the other of the protrusions when the walls of the reservoir have been rotated to the second position, to identify that position and prevent the walls from being rotated past that position.

8. A sprayer according to claim 2 wherein the ends of the membrane are secured to the tube by bands which circumscribe those ends.

9. A sprayer according to claim 2 wherein the first hole is outwardly flared in the direction of the interior of the tube.

10. A sprayer according to claim 2 wherein the spray means comprises a fan jet nozzle.

11. A sprayer according to claim 1 wherein the partition means is a piston circumscribing the tube and in operation movable within the chamber along the tube between the holes under pressure from liquid within the tube upstream of the baffle to provide pressure on the liquid concentrate within the reservoir.

12. A sprayer according to claim 11 further provided with biasing means acting on the piston means to return the piston means to its starting position when pressure of the liquid upstream of the baffle is equalized with that downstream thereof.

13. A sprayer according to claim 11 wherein the stop means is a seal secured to the walls of the reservoir and movable therewith with respect to the tube, the seal movable to block passage of concentrate in one position and to clear the hole and permit passage of concentrate in a second position.

14. A sprayer according to claim 13 wherein the walls of the reservoir are rotatable with respect to the tube to move the seal to first or second position.

15. The sprayer according to claim 2 which further comprises a car wash brush removably fitted over the sprayer end of the tube.

16. The sprayer according to claim 10, further comprises a car wash brush, wherein the spray means has a fan jet nozzle.

17. The combination of claim 16, the car wash brush having a collar to be removably fitted over the sprayer end of the tube, through which collar a channel for water from the tube to the brush is provided, a shoulder being provided within that collar when the brush is fitted on the tube so that spray from the nozzle is directed against the shoulder to produce turbulence and hence foam when the concentrate is soap and soap is being forced into the stream of water passing through the tube.

18. The combination of claim 15 wherein handle grips are secured to the tube on either side of the reservoir.

19. The combination of a sprayer according to claim 11 and a car wash brush removably fitted over the sprayer end of the tube.

20. The combination of claim 19, the car wash brush having a collar to be removably fitted over the sprayer end of the tube, through which collar a channel for water from the tube to the brush is provided, a shoulder being provided within that collar when the brush is fitted on the tube so that spray from the nozzle is directed against the shoulder to produce turbulence and hence foam when the concentrate is soap and soap is being forced into the stream of water passing through the tube.

* * * * *